(12) United States Patent
Sumiya et al.

(10) Patent No.: US 9,033,397 B2
(45) Date of Patent: May 19, 2015

(54) DEVICE FOR OPENING AND CLOSING A SLIDING DOOR AND METHOD FOR ASSEMBLING THE SAME

(75) Inventors: Seiichi Sumiya, Takahama (JP); Ryoichi Fukumoto, Nagoya (JP); Kenta Mori, Kariya (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 37 days.

(21) Appl. No.: 13/996,921

(22) PCT Filed: Dec. 19, 2011

(86) PCT No.: PCT/JP2011/079418
§ 371 (c)(1),
(2), (4) Date: Jul. 26, 2013

(87) PCT Pub. No.: WO2012/086608
PCT Pub. Date: Jun. 28, 2012

(65) Prior Publication Data
US 2013/0320704 A1 Dec. 5, 2013

(30) Foreign Application Priority Data

Dec. 24, 2010 (JP) ................. 2010-287476
Dec. 24, 2010 (JP) ................. 2010-287477

(51) Int. Cl.
*B60J 5/06* (2006.01)
*E05F 15/14* (2006.01)

(52) U.S. Cl.
CPC .......... *B60J 5/06* (2013.01); *E05F 15/146* (2013.01); *E05Y 2900/531* (2013.01)

(58) Field of Classification Search
USPC ............................ 296/155; 49/360
See application file for complete search history.

(56) References Cited

U.S. PATENT DOCUMENTS 5,168,666 A * 12/1992 Koura et al. ............ 49/360
5,551,190 A * 9/1996 Yamagishi et al. .......... 49/360
(Continued)

FOREIGN PATENT DOCUMENTS

JP 8-232539 A 9/1996
JP 10-008828 A 1/1998
(Continued)

OTHER PUBLICATIONS

English translation of International Preliminary Report on Patentability forms (PCT/IB/373) and (PCT/ISA/237) issued on Jul. 2, 2013 by the International Bureau of WIPO in corresponding International Application No. PCT/JP2011/079418 (5 pages).
(Continued)

*Primary Examiner* — Joseph D Pape
(74) *Attorney, Agent, or Firm* — Buchanan Ingersoll & Rooney PC

(57) ABSTRACT

A rail unit includes a lower rail, which guides the movement of a guide member connected to a sliding door, a front bracket, which is provided on the lower rail and fixed to a vehicle body, a rear bracket, and a center bracket. The rail unit is inserted into a first insertion hole, which is located below a lower panel provided on the vehicle body at a position below a door opening and opens outward in the vehicle body in the lateral direction of the vehicle. A drive unit is inserted into a second insertion hole, which is formed in the lower panel and opens upward in the vehicle. The drive unit is layered on an upper side of a drive pulley provided in the center bracket to rotate the drive pulley.

15 Claims, 8 Drawing Sheets

(56) References Cited

U.S. PATENT DOCUMENTS

| | | | |
|---|---|---|---|
| 5,806,246 A | 9/1998 | Azuma | |
| 6,152,519 A | 11/2000 | Blank et al. | |
| 6,185,873 B1 | 2/2001 | Saito | |
| 7,325,361 B2 | 2/2008 | Rogers, Jr. et al. | |
| 2004/0221511 A1 | 11/2004 | Rogers, Jr. et al. | |

FOREIGN PATENT DOCUMENTS

| | | | |
|---|---|---|---|
| JP | 11-286215 A | 10/1999 | |
| JP | 11-314522 A | 11/1999 | |
| JP | 2005-054448 A | 3/2005 | |
| JP | 2005-088707 A | 4/2005 | |
| JP | 3651186 B2 | 5/2005 | |
| JP | 2006-037502 A | 2/2006 | |

OTHER PUBLICATIONS

Office Action issued on Feb. 18, 2014, by the Japan Patent Office in corresponding Japanese Patent Application No. 2010-287477, and a partial English Translation of the Office Action. (3 pages).

International Search Report (PCT/ISA/210) issued on Mar. 27, 2012, by the Japanese Patent Office as the International Searching Authority for International Application No. PCT/JP2011/079418.

\* cited by examiner

DEVICE FOR OPENING AND CLOSING A SLIDING DOOR AND METHOD FOR ASSEMBLING THE SAME

FIELD OF THE INVENTION

The present invention relates to a device for opening and closing a sliding door and a method for assembling the same.

BACKGROUND OF THE INVENTION

Conventionally, various types of devices for opening and closing a sliding door have been proposed. For example, a device for opening and closing a sliding door disclosed in Patent Document 1 includes a rail portion (90a), which is arranged on a base plate portion (90) and guides movement of a connection portion (1c) connected to the sliding door, a pulley (91), a sprocket (92), drive portions (93, 94, 95), which rotate the sprocket, and a drive tape (8), to which the connection portion (1c) is fixed. The drive tape is wrapped around the pulley and the sprocket. The device for opening and closing a sliding door is assembled in a portion below a door opening (2) formed in a lateral side of a vehicle body (4) in the vertical direction in a state in which members such as a drive portion are assembled in the base plate portion including the rail portion in advance.

Also, a device for opening and closing a sliding door disclosed in Patent Document 2 includes a drive pulley (12), idler pulleys (17, 18) arranged in the vicinity of the drive pulley, a driven pulley (15), a drive portion (13), which rotates the drive pulley, and a belt (16), which cooperates with a sliding door. The pulleys (12, 15, 17, 18), the drive portion (13), and the belt (16) are arranged in a step panel (14), on which a passenger steps when exiting or entering a vehicle. The belt is wrapped around the drive pulley and the driven pulley. The idler pulleys control the tension and path of the belt to prevent the belt from being disengaged (jumping) from the drive pulley. The device for opening and closing a sliding door is assembled in a portion below a door opening formed in a lateral side of a vehicle body in a vertical direction in a state in which members such as a drive portion are assembled in the step panel in advance. It has been proposed that flange portions (24) are provided on the idler pulleys to prevent the belt from hanging down, and an inner tapered surface (25) is formed in each of the flange portions to reduce rubbing noise of the belt.

PRIOR ART DOCUMENTS

Patent Documents

Patent Document 1: Japanese Patent No. 3651186
Patent Document 2: Japanese Laid-Open Patent Publication No. 2006-37502

SUMMARY OF THE INVENTION

The above devices for opening and closing a sliding door are both configured to be assembled in a portion below the door opening in a state in which members such as a drive portion are assembled in an attaching portion (the base plate portion, and the step panel) in advance. Accordingly, although assembly the device is easy, it is necessary to secure sufficient space for assembling the device in the vertical direction. Therefore, in particular, it is hard to mount the device in a compact car.

In this case, it is considered that an insertion hole, which opens outward in the lateral direction of the vehicle, is formed in the vehicle body below the door opening, and the device for opening and closing a sliding door, which has been assembled, is inserted into the insertion hole to be assembled with the vehicle body. However, since the drive portion is layered in the axial direction of the drive rotary body (the sprocket and the drive pulley), namely, the vertical direction, it is expected to be necessary to enlarge the insertion hole in the vertical direction, and thus it is still hard to mount the device in the compact car.

An object of the present invention is to provide a device for opening and closing a sliding door and a method for assembling the same, which can facilitate assembly and mounting to a vehicle body.

According to a first aspect of the present invention, to solve the above described problems, a sliding door opening and closing device for driving a sliding door to open and close a door opening formed in a lateral side of a vehicle body is provided. The device includes: a rail unit configured to be attached to the vehicle body; and a drive unit attached to the rail unit. The rail unit includes: a rail portion, an attaching portion, a drive rotary body and a plurality of driven rotary bodies arranged in the attaching portion, and a rope member. The rail portion guides movement of a guide member connected to the sliding door. The attaching portion is provided in the rail portion and fixed to the vehicle body. The rope member is wrapped around the drive rotary body and the driven rotary bodies to be fixed to the guide member. The rail unit is inserted into a first insertion hole, which opens outward in a lateral direction of the vehicle and is engaged below a lower panel provided in the vehicle body below the door opening. A second insertion hole, which opens upward in the vehicle, is formed in the lower panel. The drive unit is inserted into the second insertion hole and layered on an upper side of the drive rotary body to rotate the drive rotary body.

According to a second aspect of the present invention, a method for assembling a sliding door opening and closing device to a vehicle body is provided. The sliding door opens and closes a door opening formed in a lateral side of the vehicle body. The sliding door opening and closing device includes: a rail unit configured to be attached to the vehicle body, and a drive unit attached to the rail unit. The rail unit includes: a rail portion, an attaching portion fixed to the rail portion, a drive rotary body and a plurality of driven rotary bodies arranged in the attaching portion, and a rope member. The rail portion guides movement of a guide member connected to the sliding door. The rope member is wrapped around the drive rotary body and the driven rotary bodies to be fixed to the guide member. The drive unit is layered on an upper side of the drive rotary body to drive the drive rotary body to rotate. The method includes: a first step of inserting the rail unit into a first insertion hole, and a second step of inserting the drive unit into a second insertion hole, and coupling the drive unit with the drive rotary body. The first insertion hole opens outward in a lateral direction of the vehicle and is located below a lower panel provided in the vehicle body below the door opening. The second insertion hole opens upward in the vehicle and is formed in the lower panel.

The present invention may provide a sliding door opening and closing device according to an aspect mentioned below. A sliding door opening and closing device for driving a sliding door to open and close a door opening formed in a lateral side of a vehicle body is provided. The sliding door opening and closing device includes: a rail unit configured to be attached to the vehicle body, and a drive unit attached to the rail unit.

The rail unit includes: a rail portion, an attaching portion fixed to the rail portion, a drive rotary body and a plurality of driven rotary bodies arranged in the attaching portion, a rope member, and a drive unit. The rail portion guides movement of a guide member connected to the sliding door. The rope member is wrapped around the drive rotary body and the driven rotary bodies to be fixed to the guide member. The drive unit drives the drive rotary body to rotate. The rail portion includes a curved portion arranged in an intermediate portion in a front-back direction of the vehicle, a rear end portion of the rail portion located more backward than the curved portion linearly extends backward in the vehicle, and a front end portion of the rail portion located more forward than the curved portion obliquely extends inward in the lateral direction of the vehicle progressively toward a front of the vehicle. Two of the driven rotary bodies are respectively arranged in the front end portion and the rear end portion of the rail portion to turn around a moving direction of the rope member. The drive rotary body is arranged to correspond to the curved portion of the rail portion and is engaged on a side away from the rail portion. The rope member, which is wrapped over the two driven rotary bodies, is wrapped around the drive rotary body.

EFFECTS OF THE INVENTION

According to the present invention, a device for opening and closing a sliding door and a method for assembling the same facilitate assembly and mounting with respect to a vehicle body.

DETAILED DESCRIPTION OF THE PREFERRED EMBODIMENTS

First Embodiment

Figure 1:
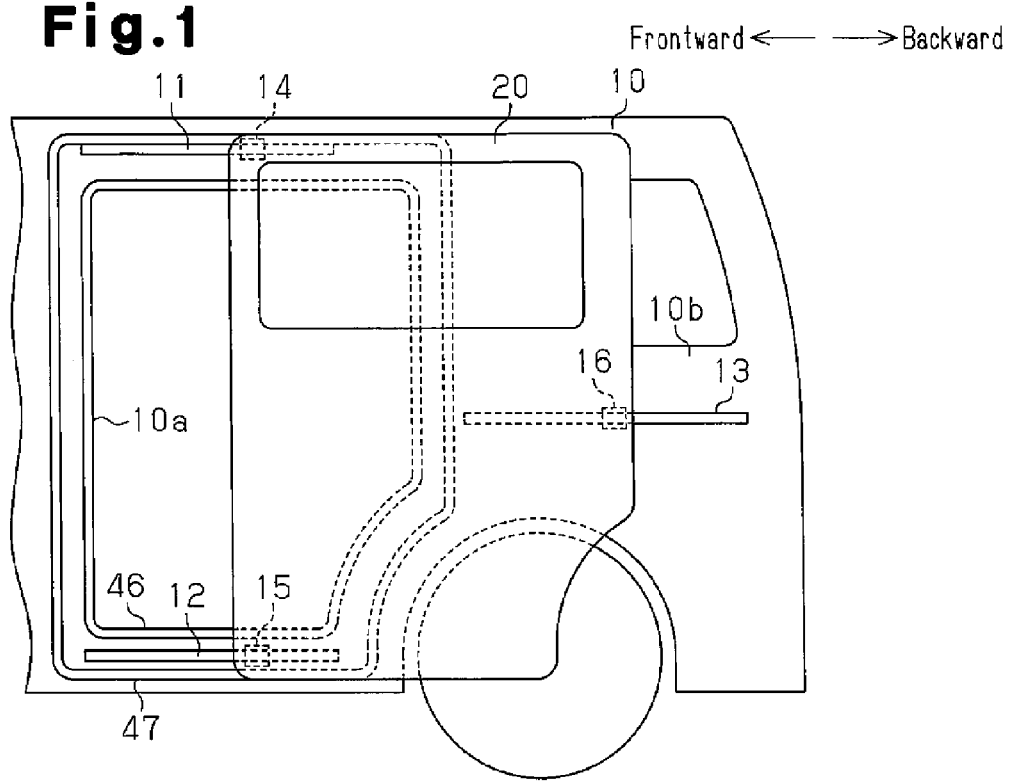
FIG. 1 is a side view schematically illustrating a first embodiment of the present invention.

A first embodiment of the present invention will be described with reference to FIG. 1. As shown in FIG. 1, a vehicle body 10 forming the main body of a vehicle such as an automobile has a door opening 10a formed in a lateral side of the vehicle. An upper rail 11 and a lower rail 12, which are rail portions, extend in the front-back direction of the vehicle along an upper end and a lower end of the door opening 10a. Also, a center rail 13, which extends in the front-back direction of the vehicle in a quarter panel 10b behind the door opening 10a, is provided on the vehicle body 10. A sliding door 20 is supported by the upper rail 11, the lower rail 12, and the center rail 13 via guide roller units 14, 15, and 16, respectively in a moveable manner in the front-back direction of the vehicle. The guide roller unit 15 configures a guide member. The sliding door 20 opens and closes the door opening 10a according to the movement in the front-back direction of the vehicle.

Figure 2:
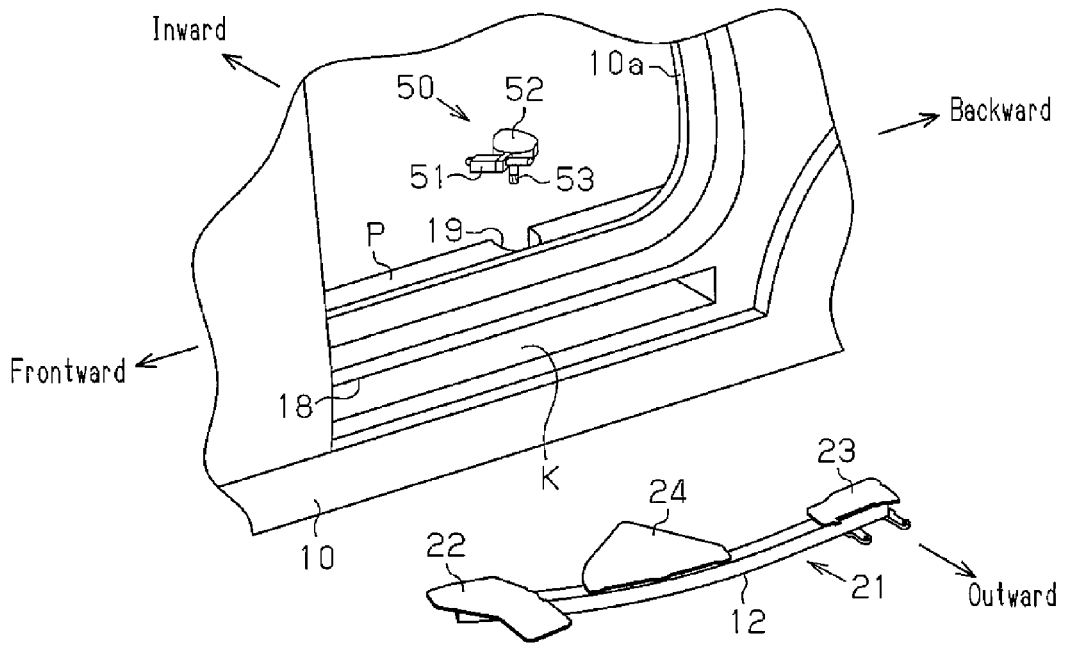
FIG. 2 is an exploded perspective view schematically illustrating the present embodiment.

As shown in FIG. 2, the vehicle body 10 includes a step-shaped lower panel P, which protrudes inward in the lateral direction of the vehicle below the door opening 10a, and a first insertion hole 18, which opens outward in the lateral direction of the vehicle below an upper surface of the lower panel P. A rail unit 21, which mounts members such as the lower rail 12 thereon, is inserted into the first insertion hole 18 from outward in the lateral direction of the vehicle to be fixed on the vehicle body 10. That is, the first insertion hole 18 has substantially a minimum opening size in the lateral direction of the vehicle so that only the rail unit 21 can be inserted.

Figure 4:
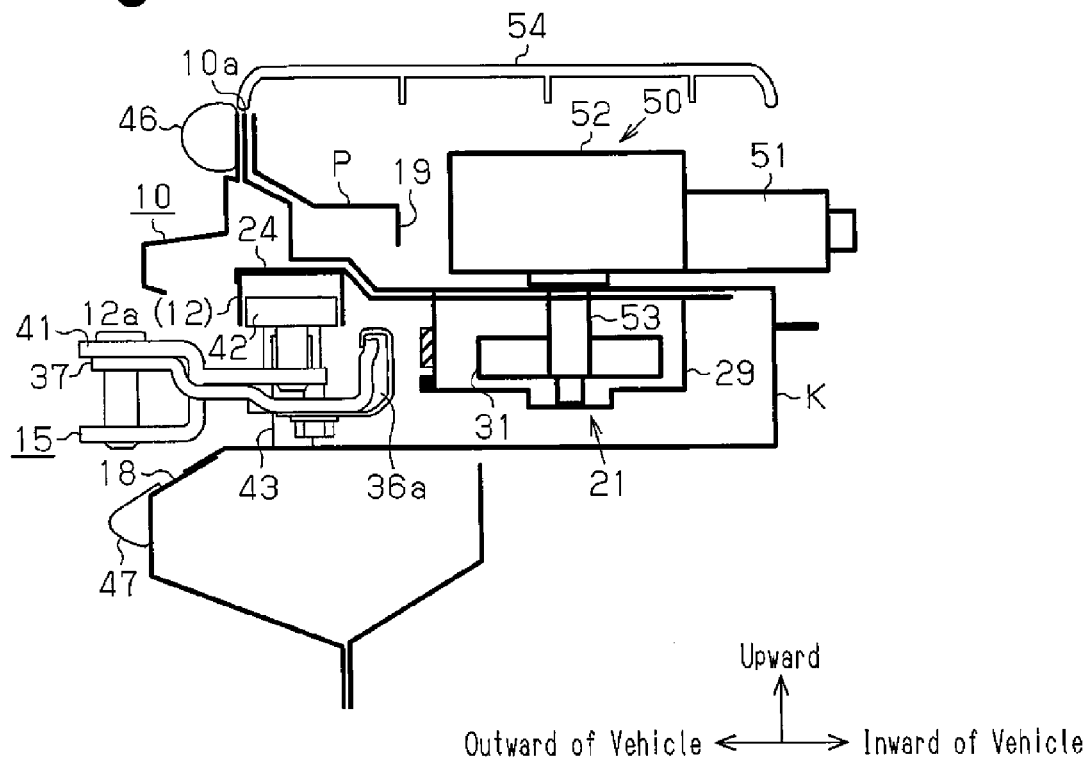
FIG. 4 is a cross-sectional view taken along line A-A of FIG. 3.
Figure 5:
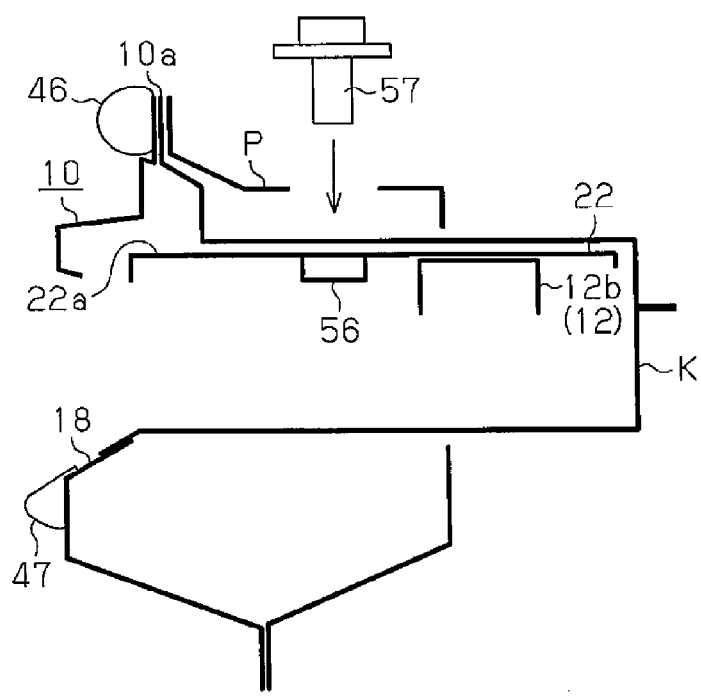
FIG. 5 is a cross-sectional view taken along line B-B of FIG. 3.

More specifically, as shown in FIGS. 4 and 5, the vehicle body 10 includes a case K with substantially a U-shaped cross section. The case K opens outward in the lateral direction of the vehicle and is connected to the first insertion hole 18 at an opening end thereof. The case K extends through in the front-back direction of the vehicle (direction perpendicular to the sheet of the drawings of FIGS. 4 and 5) below the upper surface of the lower panel P.

Figure 3:
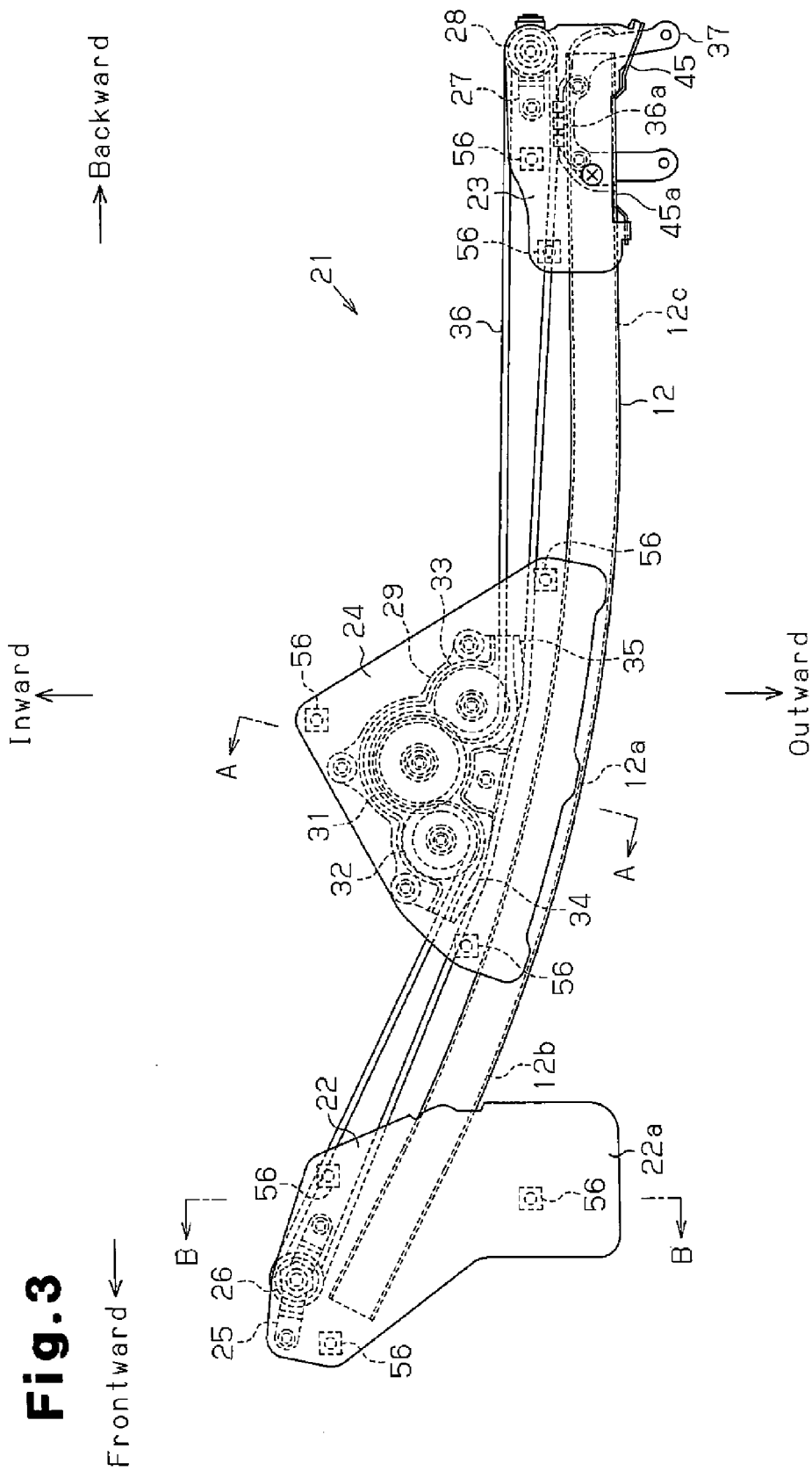
FIG. 3 is a plan view illustrating a rail unit.

In contrast, as shown in FIG. 3, the rail unit 21 is configured by the lower rail 12, a front bracket 22 as a front attaching part, a rear bracket 23 as a rear attaching part, and a center bracket 24 as a central attaching part. The front bracket 22, the rear bracket 23, and the center bracket 24 are respectively fixed to a front end portion, a rear end portion, and a central portion in the longitudinal direction of the lower rail 12 by welding, for example. The front bracket 22, the rear bracket 23, and the center bracket 24 configure an attaching portion. That is, the attaching portion divided into the three attaching parts (the front bracket 22, the rear bracket 23, and the center bracket 24) is unified by the lower rail 12. In other words, the front bracket 22, the rear bracket 23, and the center bracket 24 are separate from each other and arranged with respect to the lower rail 12 within the necessary minimum range. The lower rail 12 is formed of a metal plate, for example. The lower rail 12 includes a curved portion 12a as a flexing portion in the central portion in the longitudinal direction and a flexed portion 12b inclined inward in the lateral direction of the vehicle in front of the curved portion 12a. The lower rail 12 further includes a linear portion 12c, which extends backward in the vehicle behind the curved portion 12a. As shown in FIG. 4, the lower rail 12 has a constant substantially U-shaped cross-section, which opens downward.

As shown in FIG. 3, the front bracket 22 is formed of a metal plate, for example, and fixed to a front end portion of the flexed portion 12b. A portion of the front bracket 22 that protrudes inward in the lateral direction of the vehicle more than the flexed portion 12b supports a driven pulley 26 as a driven rotary body in a state in which the driven pulley 26 is retained in an axial direction (perpendicular to the plane of FIG. 3) between the lower surface of the portion and a substantially U-shaped bracket 25, which opens upward. The front bracket 22 has a substantially quadrangular projection portion 22a, which protrudes outward in the lateral direction of the vehicle more than the flexed portion 12b.

The rear bracket 23 is formed of a metal plate, for example, and fixed to a rear end portion of the linear portion 12c. A portion of the rear bracket 23 that protrudes inward in the lateral direction of the vehicle more than the linear portion 12c of the rear bracket 23 supports a driven pulley 28 as a driven rotary body in a state in which the driven pulley 28 is retained in the axial direction between the lower surface of the portion and a substantially U-shaped bracket 27, which opens upward.

The center bracket 24 is formed of a metal plate, for example, and fixed to substantially the entire portion of the curved portion 12a. The center bracket 24 represents a substantially triangular shape, which sharpens inward in the lateral direction of the vehicle. The portion that protrudes inward in the lateral direction of the vehicle supports a drive pulley 31 as a drive rotary body and a pair of idler pulleys 32 and 33 in a state in which the pulleys 31 to 33 are retained between the lower surface of the portion and a substantially box-shaped housing 29, which opens upward. The housing 29 is formed of a plastic material, for example. The idler pulleys 32 and 33 sandwich the drive pulley 31 at positions closer to the curved portion 12a than the drive pulley 31 and are arranged adjacent to the drive pulley 31 from front and behind, respectively. An outer surface of the housing 29 facing the lower rail 12 forms guide portions 34 and 35 at the positions of the idler pulleys 32 and 33, respectively. The guide portions 34 and 35 are curved with curvature radii less than the curvature radius of the curved portion 12a.

Gear-shaped protrusions and recesses are formed on the outer peripheral surfaces of the driven pulleys 26 and 28, and an annular toothed belt 36, which serves as a rope member, is wrapped around the driven pulleys 26 and 28 such that the toothed belt 36 engages with the driven pulleys 26 and 28. That is, a part of the toothed belt 36 that is proximate to the lower rail 12 and extends from the rear driven pulley 28 to the front driven pulley 26 in the front-back direction of the vehicle slides on the guide portions 34 and 35 to be guided by the guide portions 34 and 35. A part of the toothed belt 36 is wrapped around the driven pulley 26 in the clockwise direction in FIG. 3 and turns around backward in the vehicle at the position remote from the lower rail 12. A part of the toothed belt 36 that extends backward in the vehicle toward the front idler pulley 32 is wrapped around the idler pulley 32 in the counterclockwise direction at the position proximate to the lower rail 12, and wrapped around the drive pulley 31 in the clockwise direction shown in FIG. 3 at the position remote from the lower rail 12. The toothed belt 36 is further wrapped around the idler pulley 33 proximate to the lower rail 12 in the counterclockwise direction shown in FIG. 3. A part of the toothed belt 36 that extends backward in the vehicle from the rear idler pulley 33 toward the rear driven pulley 28 is wrapped around the driven pulley 28 in the clockwise direction shown in FIG. 3 to turn around forward in the vehicle to be connected to a part of the toothed belt 36 proximate to the lower rail 12. The idler pulleys 32 and 33, which are arranged in the vicinity of the drive pulley 31, control the tension and path of the toothed belt 36 to prevent the toothed belt 36 from being disengaged (jumping) from the drive pulley 31. An arcuate bracket 37, which is formed of a metal plate, for example, is fixed to fixing portions 36a provided on predetermined positions at which the toothed belt 36 is proximate to the lower rail 12.

Figure 6:
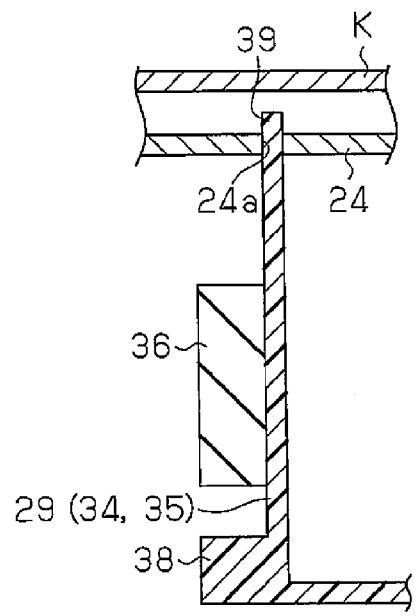
FIG. 6 is an enlarged view of FIG. 4.

As enlarged and shown in FIG. 6, a flange-shaped retainer portion 38, which protrudes outward in the lateral direction of the vehicle from lower ends of the guide portions 34 and 35, is formed on the housing 29. The retainer portion 38 retains a lower end of the toothed belt 36 guided by the guide portions 34 and 35 to restrict the lower end from hanging down. Further, fitting protrusions 39, which protrude upward from predetermined positions on an opening end surface (upper end surface) of the housing 29, are formed on the housing 29. Each fitting protrusion 39 fits into a corresponding receiving recess 24a formed in the center bracket 24 to receive the load applied to the housing 29. For example, when the tension of the toothed belt 36 is applied to the housing 29 (guide portions 34 and 35), component force inward in the lateral direction of the vehicle is generated with respect to the housing 29 to cause to deform the housing 29. However, the load applied to the housing 29 is supported by the fitting protrusions 39 so that the housing 29 is prevented from being deformed.

The rail unit 21, which is configured as above described, is fixed to the vehicle body 10 by fastening fasteners 57 such as fastening bolts or screws, which are inserted through upper walls of the lower panel P and the case K, to a plurality of nuts 56, which are welded onto each of the lower surfaces of the front bracket 22, the rear bracket 23, and the center bracket 24 as shown in FIG. 5. That is, the front bracket 22, the rear bracket 23, and the center bracket 24 include a function of fixing the rail unit 21 to the vehicle body 10 as well as a function of supporting the drive pulley 31. As shown in FIG. 3, in particular, the front bracket 22 is fixed to the vehicle body 10 in a more stable manner by the nuts 56 arranged on opposite sides of the lower rail 12 in the lateral direction of the vehicle with the lower rail 12 sandwiched therebetween.

As shown in FIG. 4, the bracket 37 is fastened to the guide roller unit 15. That is, the guide roller unit 15 has a roller support bracket 41, which is coupled with a lower portion of the sliding door 20 in a rotational manner about a rotation axis that extends in the vertical direction to be inserted into the case K via the first insertion hole 18, is fastened to the bracket 37 in the roller support bracket 41. The guide roller unit 15 has a pair of guide rollers 42, and a load roller 43 arranged between the guide rollers 42. The load roller 43 is supported by the case K in the first insertion hole 18 to permit rolling, and the guide rollers 42 are mounted to permit rolling on the lower rail 12, and the guide roller unit 15 is supported by the vehicle body 10 in a moveable manner.

Figure 7:
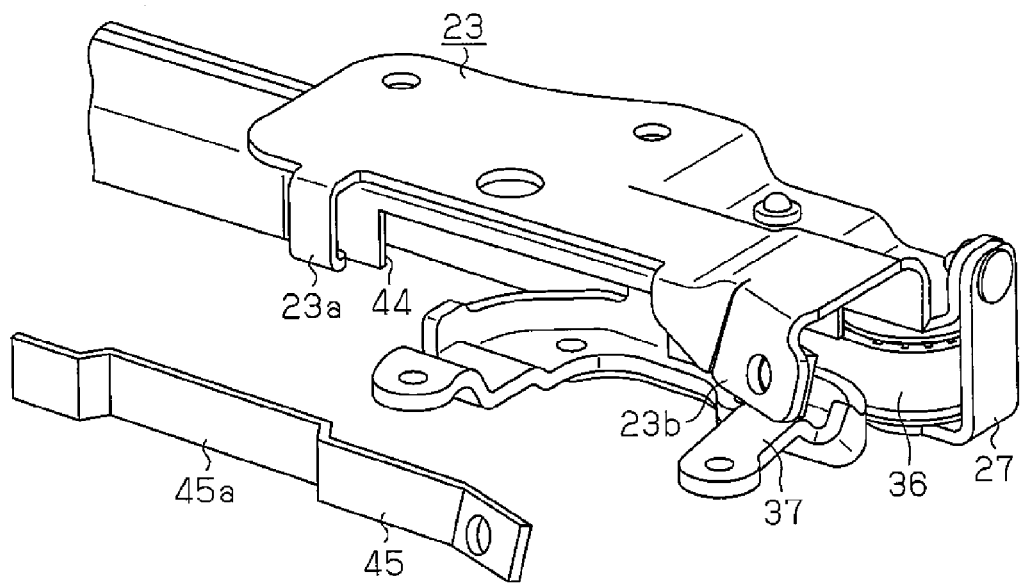
FIG. 7 is an exploded perspective view illustrating the embodiment.

As shown in FIG. 7, a substantially quadrangular cutaway portion 44 is formed in the rear end portion of the lower rail 12 (linear portion 12c) by cutting an outer lateral wall of the lower rail 12 in the lateral direction of the vehicle facing the sliding door 20. In the guide roller unit 15, the guide rollers 42 are sequentially inserted into the lower rail 12 through the cutaway portion 44 so that the guide rollers 42 are permitted to roll on the lower rail 12. The roller support bracket 41 is fastened to the bracket 37 so that the guide roller unit 15 cooperates with the toothed belt 36 via the bracket 37.

After the guide rollers 42 are mounted, the cutaway portion 44 is closed by an elongated lid body 45, which is formed of a metal plate, for example. That is, a lock piece 23a, which extends downward in front of the cutaway portion 44, is formed in the rear bracket 23. Also, a flange-shaped mount piece 23b, which extends downward behind the cutaway portion 44, is formed in the rear bracket 23. A front end portion of the lid body 45 is inserted into the gap defined between the lateral wall of the lower rail 12 and the lock piece 23a. A rear end portion of the lid body 45 is layered on an outer lateral surface of the mount piece 23b to be fastened to the mount piece 23b by an appropriate fastener. Thereby, the lid body 45 is fixed to the rear bracket 23. The lock piece 23a and the mount piece 23b configure a fixing portion. A lid portion 45a, which protrudes in a trapezoidal shape to conform to the profile of the cutaway portion 44, is formed in the lid body 45. The lid body 45, when fixed to the rear bracket 23, closes the cutaway portion 44 by fitting the lid portion 45a into the cutaway portion 44, while restricting the generation of the difference in level between the lid portion 45a and the lower rail 12. Accordingly, the guide rollers 42, which are mounted in the lower rail 12 to permit rolling, are prevented from being disengaged from the lower rail 12.

Therefore, the load roller 43 rolls in the case K in a state in which the guide rollers 42 are guided by the lower rail 12 so that the sliding door 20, which is coupled with the guide roller unit 15, opens and closes the door opening 10a by sliding in the front-back direction of the vehicle. In particular, the guide rollers 42 are guided to the curved portion 12a or the flexed portion 12b so that the sliding door 20 is pushed outward of the vehicle immediately after the sliding door 20 is operated to be opened from a completely closed position, or drawn inward of the vehicle immediately before moved to the completely closed position, for example. This is because the sliding door 20 is allowed to slide backward when operated to be opened so that the sliding door 20 and a lateral surface of the vehicle body 10 are flush with each other when completely closed. As shown in FIG. 4, sealing members 46 and 47 are respectively fixed to an upper portion and a lower portion of the vehicle body 10 with the first insertion hole 18 located therebetween. The sealing members 46 and 47 protrude outward in the lateral direction of the vehicle to press-fit on the sliding door 20 at the completely closed position in a fluid-tight manner.

As shown in FIG. 2, a second insertion hole 19, which opens upward in the vehicle in accordance with the arrangement of the center bracket (drive pulley 31), is formed in the lower panel P. A drive unit 50 is inserted into the second insertion hole 19 from above in the vehicle to be fixed on the case K. That is, the second insertion hole 19 has substantially a minimum opening size so that only the drive unit 50 can be inserted. As shown in FIG. 4, the drive unit 50 includes an electric motor 51, and a reducer 52, which reduces the rotation speed of the electric motor 51. The drive unit 50 is coupled with the drive pulley 31 in the housing 29 by an output shaft 53, which projects downward in the vehicle to extend through an upper wall of the case K and the center bracket 24. Accordingly, when the electric motor 51 is driven, the rotation speed thereof is reduced by the reducer 52, and the rotation is transferred to the drive pulley 31 via the output shaft 53. Thereby, the drive pulley 31 rotates to move the toothed belt 36 in the direction in accordance with the rotation direction. An upper portion of the second insertion hole 19 (lower panel P) into which the drive unit 50 has been inserted is covered by a plate-like step trim 54 formed of a plastic material, for example, to be hidden from outside.

In FIG. 3, it is assumed that the drive pulley 31 rotates in the clockwise direction shown in the drawing, for example. At this time, the toothed belt 36 rotates in the clockwise direction shown in FIG. 3 as a whole so that the fixing portions 36a, to which the guide roller unit 15 is fixed, moves forward in the vehicle to operate to close the sliding door 20. In contrast, it is assumed that the drive pulley 31 rotates in the counterclockwise direction shown in FIG. 3. At this time, the toothed belt 36 rotates in the counterclockwise direction shown in FIG. 3 as a whole so that the fixing portions 36a to which the guide roller unit 15 is fixed moves backward in the vehicle to operate to open the sliding door 20.

Next, an assembly method according to the present embodiment will be described.

In assembling the device for opening and closing a sliding door, an operator inserts the rail unit 21 in which components such as the lower rail 12, the front bracket 22, the rear bracket 23, and the center bracket 24 have been assembled in advance into the first insertion hole 18 from outside in the lateral direction of the vehicle so that the upper surface of the front bracket 22 contacts the lower surface of the upper wall of the case K. At this time, as shown in FIG. 5, the operator holds the projection portion 22a of the front bracket 22 to support and determine the position of the flexed portion 12b of the lower rail 12, which has been inserted into the first insertion hole 18. The operator then fastens the fastener 57, which extends through the lower panel P and the upper wall of the case K, to the corresponding nut 56. Thereby, the rail unit 21 is fixed and provided on the upper wall (vehicle body 10) of the case K in the case K (first step).

Then, the operator inserts the drive unit 50 into the second insertion hole 19 from above in the vehicle to couple the drive pulley 31 with the output shaft 53, which extends through the upper wall of the case K and the center bracket 24, such that the output shaft 53 rotates integrally with the drive pulley 31, and fix the reducer 52 (drive unit 50) on the case K. Thereby, the drive unit 50 is fixed and provided on the case K (vehicle body 10) in the second insertion hole 19 (second step).

The above described embodiment has the following advantages.

(1) The rail unit 21 in which the lower rail 12, and the front bracket 22, the rear bracket 23, and the center bracket 24 have been assembled in advance is inserted into the first insertion hole 18 from outside in the lateral direction of the vehicle to be installed in the vehicle body 10. At this time, the opening size of the first insertion hole 18 in the vertical direction is reduced because the drive unit 50 has not been provided for the rail unit 21 (drive pulley 31) yet. In contrast, the drive unit 50 is inserted into the second insertion hole 19 from above in the vehicle to be coupled with the drive pulley 31 to be installed in the vehicle body 10. At this time, the second insertion hole 19 has an opening size sufficient for inserting only the drive unit 50 into the second insertion hole 19. Accordingly, the opening size is reduced in comparison to the opening size for inserting the rail unit 21 and the drive unit 50, for example. Accordingly, the assembly and mounting to the vehicle body 10 as the entire device are facilitated.

(2) When assembling (installing) the rail unit 21 to the vehicle body 10, the operator holds the projection portion 22a of the front bracket 22 to support the front end portion (flexed portion 12b) of the lower rail 12, which has been inserted into the first insertion hole 18. This allows the operator to smoothly fasten the fastener 57 from above. Accordingly, the operability is improved and the assembly is facilitated.

(3) The front bracket 22 is fixed to the upper wall of the case K (vehicle body 10) in a more stable manner by fastening the fastener 57 with the corresponding nut 56 on the opposite sides of the lower rail 12 in the lateral direction of the vehicle with the front end portion (flexed portion 12b) of the lower rail 12 sandwiched therebetween. In particular, the flexed portion 12b of the front bracket 22 to be fixed receives reaction force of the sealing members 46 and 47 when the sliding door 20 is at a completely closed position. At this time, the load from the guide roller unit 15 (guide rollers 42) tends to be increased. The guide roller unit 15 is more firmly retained in accordance with the increased load, accordingly.

(4) With respect to the lower rail 12 necessary for supporting the sliding door 20 (guide roller unit 15), the front bracket 22, the rear bracket 23, and the center bracket 24 are arranged at only positions necessary to support the drive pulley 31. Accordingly, the weight of the entire device is reduced.

(5) Since the device is configured such that the rail unit 21 is inserted into the first insertion hole 18 in the lateral direction of the vehicle, even a sealing structure (sealing members 46 and 47) peculiar to a compact car or a light vehicle can mount the rail unit 21 (device for opening and closing a sliding door) below the door opening 10a. That is, since the device for opening and closing a sliding door is mounted without changing the height of the step trim 54 (step height) while maintaining the sealing structure, getting on and off the vehicle is facilitated. Since the device for opening and closing a sliding door is mounted without changing the sealing structure, the modification of the vehicle body 10 (body panel) is restricted to minimum. Accordingly, increase in the mass caused by adding panels and increase in the cost are reduced.

(6) Since the rail unit 21 and the drive unit 50 as separate components are assembled in the vehicle body 10 separately, the assembly and the mounting to the vehicle body 10 are facilitated.

(7) Even a vehicle in which the space inside the quarter panel 10b (quarter portion) or in the sliding door 20 is difficult to be secured can mount the device for opening and closing a sliding door by using the lower space below the door opening 10a. That is, in particular, in the compact vehicle and the light vehicle with a narrow vehicle width, it is not necessary to increase the thickness of the door or the quarter portion. Accordingly, the reduction of the space in the passenger compartment is avoided.

(8) Since there is no cable that extends through the opening in the vehicle body or the door in such a type in which the drive unit is arranged in the door or inside the quarter portion, operations to retain a terminal of the cable on the door or the vehicle body and extend the cable through the opening in the vehicle body or the door are not necessary. Accordingly, the assembly is facilitated.

(9) The toothed belt 36 is wrapped around the two driven pulleys 26 and 28, which are arranged to correspond to the front end and the rear end of the lower rail 12, respectively, and the drive pulley 31, which is arranged to correspond to the curved portion 12a of the lower rail 12. Thereby, the path of the toothed belt 36 is set in the direction in which the lower rail 12 extends. In this case, the direction of the toothed belt 36 is switched between the section forward of and rearward of a reference position, which corresponds to the curved portion 12a. Accordingly, the diversion of the path of the toothed belt 36 is guided at the drive pulley 31 (and the idler pulleys 32 and 33, which restrict the toothed belt 36 from being disengaged). That is, the drive pulley 31, which moves the toothed belt 36 between the two driven pulleys 26 and 28, is diverted by being rotated by the drive unit 50 to guide the diversion of the path of the toothed belt 36. Accordingly, it is not necessary to provide a driven pulley (intermediate pulley) for guiding the diversion, for example. Therefore, increase in the number of components and increase in the mass are restricted. Also, the cost is reduced. Further, the drive pulley 31 is arranged to correspond to the curved portion 12a. Accordingly, the diameter of the drive pulley 31 can be increased without restricting the amount of opening of the sliding door 20 to secure sufficient drive force (torque).

According to the reduction of the number of the pulleys, the number of times of flexing the toothed belt 36 is reduced so that the reliability is improved.

(10) The housing 29, which accommodates the drive pulley 31, namely, the housing 29, which is arranged to correspond to the curved portion 12a, allows the toothed belt 36 to slide on the guide portions 34 and 35 to guide the diversion of the path of the toothed belt 36. That is, the housing 29, which accommodates the drive pulley 31, is diverted to guide the diversion of the path of the toothed belt 36. Accordingly, it is not necessary to provide a driven pulley (intermediate pulley) or a suitable guide for guiding the diversion, for example. Therefore, increase in the number of components and increase in the mass are restricted. Also, the cost is reduced.

(11) The retainer portion 38 restricts hanging down of the toothed belt 36. Thereby, for example when the device is assembled to the vehicle body 10, the assembly operation is not hampered by drooping of the toothed belt. Accordingly, the assembly is facilitated. Even if the toothed belt 36 is stretched due to aging degradation, the toothed belt 36 is prevented from being disengaged from the guide portions 34 and 35.

(12) The load applied to the housing 29 is received by the fitting protrusion 39, which fits into the receiving recess 24a of the center bracket 24. Accordingly, even if the tension of the toothed belt 36 is applied to the housing 29 (guide portions 34 and 35), for example, the load applied to the housing 29 is supported by the fitting protrusion 39 so that the housing 29 is prevented from being deformed. Therefore, only the least measures are required for increasing the rigidity of the entire housing 29, for example, the measures for increasing the board thickness of the housing 29 and arranging reinforcing ribs. Thus, an increase in the mass and the size of the housing 29 is restricted.

(13) The attaching portion divided into three parts is employed. The three parts are the front bracket 22 arranged to correspond to the front end of the lower rail 12, in which the driven pulley 26 is provided, the rear bracket 23 arranged to correspond to the rear end of the lower rail 12, in which the driven pulley 28 is provided, and the center bracket 24, in which the drive pulley 31 is provided. That is, with respect to the lower rail 12, which is necessary for supporting the sliding door 20 (guide roller unit 15), the front bracket 22, the rear bracket 23, and the center bracket 24 are arranged at only positions necessary to support the drive pulley 31. Thereby, all the space between the front bracket 22 and the center bracket 24 adjacent to each other, and the space between the center bracket 24 and the rear bracket 23 are opened. For example, in comparison to a case in which a large attaching portion that extends over the entire length of the lower rail 12 is employed, the size and the weight of the entire attaching portion are reduced. Since the size is reduced, the operability during assembly is improved. Alternatively, since the size is reduced, fuel consumption of the vehicle is improved. Also, increase in the cost is restricted.

(14) The guide rollers 42 mounted to permit rolling in the lower rail 12 through the cutaway portion 44 are prevented from being falling off from the lower rail 12 by fixing the lid body 45 to the lock piece 23a and the mount piece 23b of the rear bracket 23. In this case, the lock piece 23a and the mount piece 23b are provided in the rear bracket 23 (integrally) to be also used as a member for fixing the lid body 45 so that the lid body 45 is fixed without increasing the number of components. Also, an increase in the cost is restricted.

(15) Generally, the lower rail 12 is shaped in accordance with each type of the vehicles due to the amount of opening (stroke) and the track of the sliding door 20. In the present embodiment, the front bracket 22, the rear bracket 23, and the center bracket 24, which are three separate pieces, are fixed to the lower rail 12. Accordingly, even if the shape of the lower rail 12 varies, it suffices if the positions of fixing the components to the lower rail 12 are changed. Thus, the flexibility for each type of the vehicle is improved. As a result, the amount of investment when developing a product can be minimized so that the cost is reduced.

Second Embodiment

A second embodiment of the present invention will be described with reference to FIG. 8. The second embodiment is different from the first embodiment in the structure of the rail unit and the arrangement of the drive unit 50 in accordance with the rail unit structure. Thus, like or the same reference numerals are given to those components that are like or the same as the corresponding components of the first embodiment. In the second embodiment, the retainer portion 38 and the fitting protrusion 39 of the first embodiment are omitted.

Figure 8:
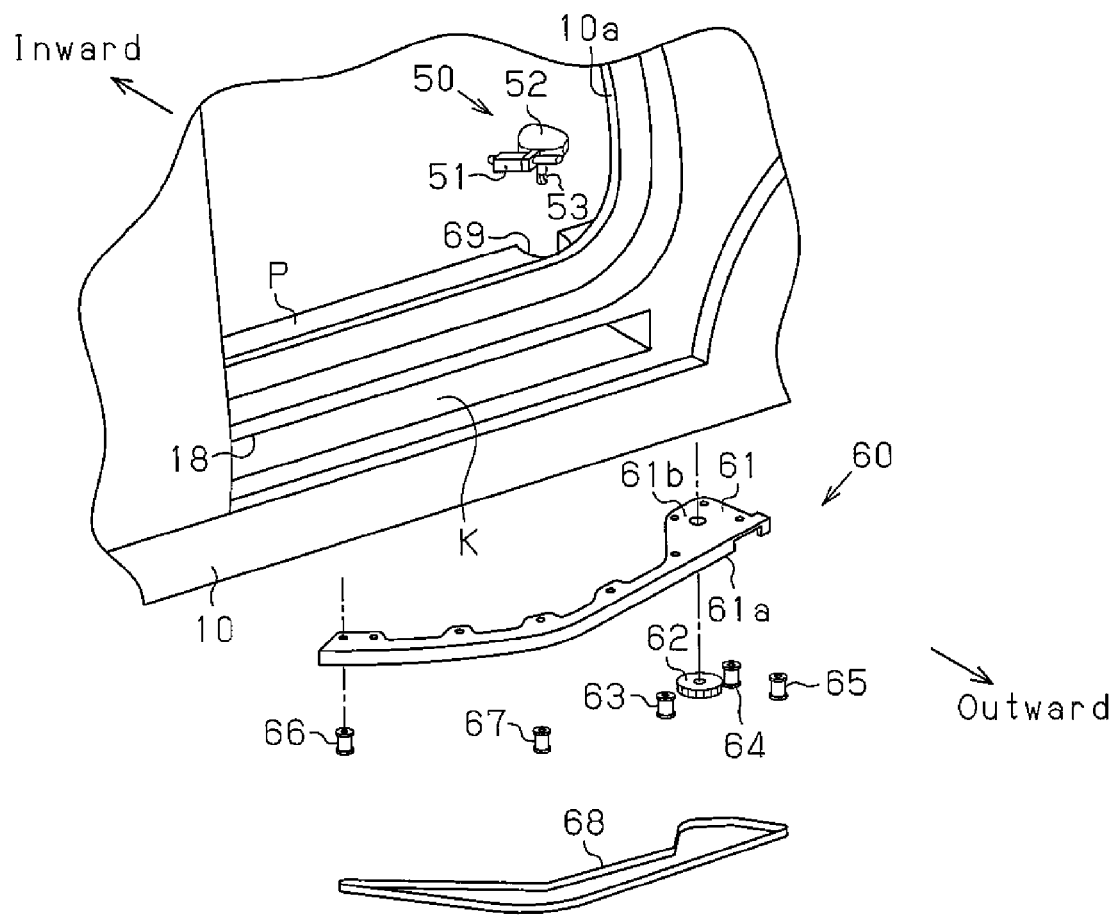
FIG. 8 is an exploded perspective view illustrating a sliding door opening and closing device according to a second embodiment of the present invention.

As shown in FIG. 8, a rail unit 60 of the present embodiment is provided with a rail panel 61, which is formed of a pressed material of a metal plate, for example. The rail panel 61 includes a rail portion 61a with a profile the same as that of the lower rail 12, and a flat plate-shaped attaching portion 61b, which extends inward in the lateral direction of the vehicle in the direction in which the rail portion 61a extends. The rail panel 61 is formed integrally with the rail portion 61a and the attaching portion 61b.

On the lower surface of a rear end portion of the attaching portion 61b, a drive pulley 62 as a drive rotary body and a pair of idler pulleys 63 and 64 are supported. A driven pulley 65 as a driven rotary body is supported behind the idler pulley 64. The idler pulleys 63 and 64 sandwich the drive pulley 62 in front of and behind the drive pulley 62, respectively. Also, on the lower surface of a front end portion of the attaching portion 61b, a driven pulley 66 as a driven rotary body is supported. On the lower surface of an intermediate portion of the attaching portion 61b in the longitudinal direction, an intermediate pulley 67 is supported. Gear-shaped protrusions and recesses are formed on the outer peripheral surface of the drive pulley 62, and a ring-shaped toothed belt 68 as a rope member is wrapped around the drive pulley 62 such that the toothed belt 68 engages with the drive pulley 62.

Figure 10:
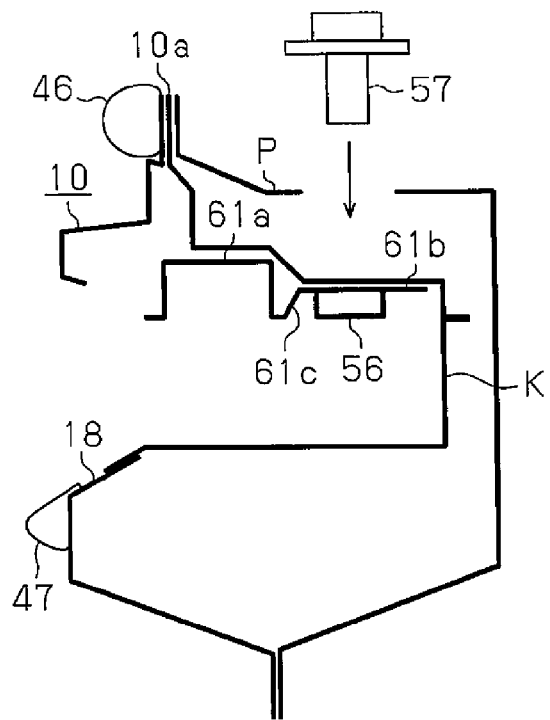
FIG. 10 is a cross-sectional view illustrating the present embodiment.

The rail unit 60 configured as above described is inserted into the first insertion hole 18 from outside in the lateral direction of the vehicle. That is, the first insertion hole 18 has substantially the minimum opening size in the lateral direction of the vehicle so that only the rail unit 60 can be inserted. As shown in FIG. 10, the rail unit 60 is fixed to the vehicle body 10 by fastening the fasteners 57, which extend through the lower panel P and the upper wall of the case K, to the plurality of nuts 56, which are welded onto the lower surface of the attaching portion 61b. That is, the attaching portion 61b includes a function of fixing the rail unit 60 to the vehicle body 10 as well as a function of supporting the drive pulley 62.

Figure 9:
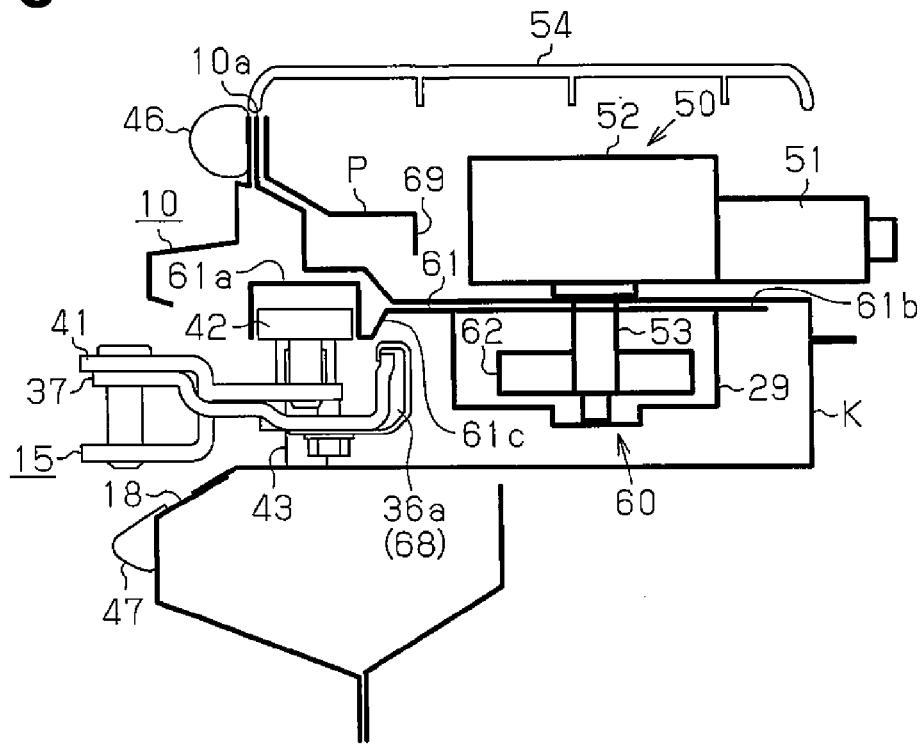
FIG. 9 is a cross-sectional view illustrating the present embodiment.

As shown in FIG. 9, the rail portion 61a with a constant U-shaped cross section, which opens downward, is connected to an outer edge of the attaching portion 61b in the lateral direction of the vehicle at a connection portion 61c, which is turned upward from an opening end edge (lower end edge) inward in the lateral direction of the vehicle. Thereby, in the rail portion 61a, a portion sufficient for guiding the guide rollers 42 is secured, and space is secured below the connection portion 61c to avoid interference with a peripheral element (toothed belt 68).

As shown in FIG. 8, a second insertion hole 69, which opens upward in the vehicle in accordance with the arrangement of the drive pulley 62, is formed in the lower panel P. The drive unit 50 is inserted into the second insertion hole 69 from above in the vehicle to be fixed on the case K. That is, the second insertion hole 69 has substantially the minimum opening size so that only the drive unit 50 can be inserted. The drive unit 50 is coupled with the drive pulley 62 by the output shaft 53, which protrudes downward in the vehicle and extends through the upper wall of the case K and the attaching portion 61b.

According to the present embodiment as described above, the following advantage are obtained in addition to the advantages of the items (1), and (5) to (8) of the first embodiment.

(1) According to the present embodiment, the attaching portion 61b including a function of supporting the drive pulley 62 and a function of being fixed to the vehicle body 10 is formed integrally with the rail portion 61a so that the number of components is reduced. Accordingly, the cost is reduced as well. Also, the mass of the rail panel 61 (rail unit 60) is reduced.

(2) Since the rail portion 61a is formed integrally with the attaching portion 61b, which is used for the fixation to the vehicle body 10, the positional accuracy between the rail portion 61a and the attaching portion 61b of the rail panel 61 as a single component is improved. Since another component (bracket) is not located between the rail portion 61a and the vehicle body 10 (case K), the positional accuracy of the rail portion 61a with respect to the vehicle body 10 is improved. Accordingly, reproducibility of suitably attaching the sliding door 20 (stability) is improved.

The above described embodiments may be modified as follows.

In the first embodiment, the lower rail 12 may be formed integrally with at least one of the front bracket 22, the rear bracket 23, and the center bracket 24. In this case, the member such as the lower rail 12 may be a pressed material of a metal plate, or a plastic material that is reinforced by glass fibers or carbon fibers.

In the second embodiment, the attaching portion 61b may have a projection portion, which protrudes more outward in the lateral direction of the vehicle than the front end portion of the rail portion 61a at the front end portion of the rail portion 61a.

In the second embodiment, the rail panel 61 may be formed of a plastic material that is reinforced by glass fibers or carbon fibers.

In the second embodiment, the rail panel 61 may be configured by joining the rail portion 61a and the attaching portion 61b as separate parts.

In each of the embodiments, a cable may be adopted as a rope member for transferring power. In this case, a drum (spool) as a drive rotary body coupled with the drive unit 50 may be adopted.

In each of the embodiments, the shape of the lower panel P is merely an example. For example, the lower panel P may be shaped as a plane that spreads along the floor of the vehicle. The shape of each of the second insertion holes 19 and 69 may be a shape that can surround the entire drive unit 50, or a shape that can surround only a part of the drive unit 50. In short, the shape of each of the second insertion holes 19 and 69 may be selected to be hidden under the vehicle floor (step trim 54) without impairing the appearance.

Figure 11:
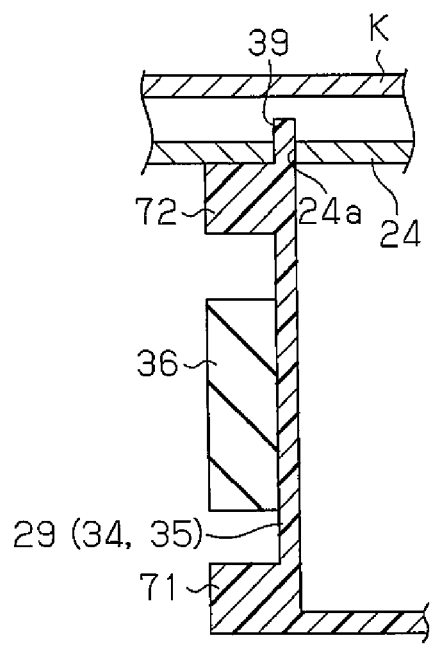
FIG. 11 is a cross-sectional view illustrating a modified embodiment of the present invention.
Figure 12:
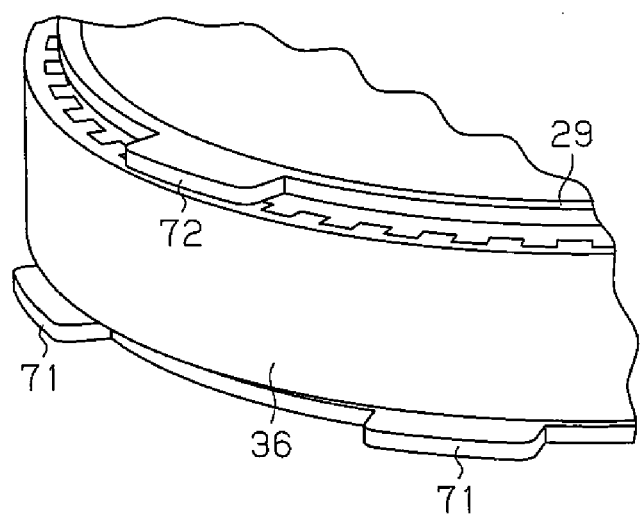
FIG. 12 is a perspective view illustrating the modified embodiment.

In each of the embodiments, as shown in FIGS. 11 and 12, one or more flange-shaped retainer portions 71, which partially protrude outward in the lateral direction of the vehicle from lower ends of the guide portions 34 and 35, may be formed on the housing 29. The retainer portions 71 restrict the toothed belt 36, which is guided by the guide portions 34 and 35, from hanging down by holding the lower end of the toothed belt 36. Also, one or more flange-shaped upper retainer portions 72, which partially protrude outward in the lateral direction of the vehicle from upper ends of the guide portions 34 and 35, may be further formed on the housing 29. The upper retainer portions 72 contact or are proximate to the lower surface of the center bracket 24, and arranged alternately with the retainer portions 71 in the direction in which the toothed belt 36 extends. Such an arrangement allows, when molding the housing 29, the retainer portions 71 and the upper retainer portions 72 to be simultaneously molded by removing them from the mold in the direction in which the housing 29 opens. According to such a modification, the toothed belt 36 is prevented from contacting the center bracket 24 (attaching portion).

Figure 13:
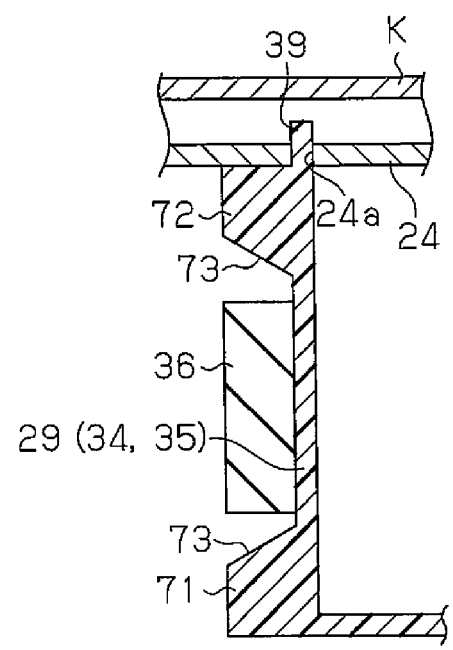
FIG. 13 is a cross-sectional view illustrating another modified embodiment of the present invention.

As shown in FIG. 13, a tapered portion 73 may be formed in each of the upper surface of each retainer portion 71 facing the toothed belt 36 and the lower surface of each upper retainer portion 72 facing the toothed belt 36. The tapered portion 73 is progressively apart from the toothed belt 36 toward the tip end thereof. This is because the toothed belt 36 is configured by a belt-shaped rubber material forming a profile thereof, and a canvas, which covers the gear-shaped protrusions and recesses (namely, the guide portions 34 and 35), so that when the canvas slides on the guide portions 34 and 35, the rubber material is avoided to slide on the retainer portions 71 or the upper retainer portions 72. Accordingly, noise generated when the rubber material slides on the retainer portions 71 or the upper retainer portions 72 is restricted.

In each of the embodiments, the center bracket 24 may be formed integrally with one of the front bracket 22 and the rear bracket 23. That is, when the center bracket 24 is formed integrally with the front bracket 22, the rear bracket 23 is separate from them. Also, when the center bracket 24 is formed integrally with the rear bracket 23, the front bracket 22 is separate from them. That is, the attaching portion divided into two attaching parts may be adopted. In this case, it is preferable that the center bracket 24 be formed integrally with the one (the front bracket 22 or the rear bracket 23) that is more proximate to the center bracket 24. Thereby, increase in the number of components is restricted and the attaching is facilitated, while the space between the front bracket 22 and the center bracket 24 or the space between the rear bracket 23 and the center bracket 24 is opened. Accordingly, the size and the weight of the entire attaching portion are reduced.

In each of the embodiments, an attaching portion configured by a step panel (refer to Patent Document 2) may be adopted. In this case, the lower rail 12 may be formed integrally with the step panel (attaching portion). In short, the drive pulley (drive rotary body) may be arranged to correspond to a flexed portion of the lower rail.

The invention claimed is:

1. A sliding door opening and closing device for driving a sliding door to open and close a door opening formed in a lateral side of a vehicle body, the device comprising:
a rail unit configured to be attached to the vehicle body; and
a drive unit attached to the rail unit, wherein
the rail unit includes:
a rail portion, which guides movement of a guide member connected to the sliding door,
an attaching portion, which is provided in the rail portion and is adapted to be fixed to the vehicle body,
a drive rotary body and a plurality of driven rotary bodies arranged in the attaching portion, and
a rope member, which is wrapped around the drive rotary body and the driven rotary bodies to be fixed to the guide member, wherein the rail unit is adapted to be inserted into a first insertion hole, which is formed in the vehicle body and opens outward in a lateral direction of the vehicle and is located below a lower panel provided in the vehicle body below the door opening, and
the drive unit is adapted to be inserted into a second insertion hole, which is formed in the lower panel of the vehicle body and opens upward in the vehicle, and the drive unit is layered on an upper side of the drive rotary body to rotate the drive rotary body.

2. The sliding door opening and closing device according to claim 1, wherein the attaching portion is formed integrally with the rail portion.

3. The sliding door opening and closing device according to claim 1, wherein a front end portion of the rail portion is slanted inward in the lateral direction of the vehicle progressively toward a front of the vehicle.

4. The sliding door opening and closing device according to claim 3, wherein the attaching portion has a projection portion at the front end portion of the rail portion, and the projection portion protrudes more outward in the lateral direction of the vehicle than the front end portion of the rail portion.

5. A method for assembling a sliding door opening and closing device to a vehicle body, which device drives a sliding door to open and close a door opening formed in a lateral side of the vehicle body,
the sliding door opening and closing device including:
a rail unit configured to be attached to the vehicle body, and
a drive unit attached to the rail unit,
wherein the rail unit includes
a rail portion, which guides movement of a guide member connected to the sliding door,
an attaching portion fixed to the rail portion,
a drive rotary body and a plurality of driven rotary bodies arranged in the attaching portion, and
a rope member, which is wrapped around the drive rotary body and the driven rotary bodies to be fixed to the guide member,
wherein the drive unit is layered on an upper side of the drive rotary body to drive the drive rotary body to rotate, the method comprising:
a first step of inserting the rail unit into a first insertion hole, which is formed in the vehicle body and opens outward in a lateral direction of the vehicle and is located below a lower panel provided in the vehicle body below the door opening, and
a second step of inserting the drive unit into a second insertion hole, which is formed in the lower panel of the vehicle body and opens upward in the vehicle, and coupling the drive unit with the drive rotary body.

6. The sliding door opening and closing device according to claim 1, wherein
the rail portion includes a curved portion arranged in an intermediate portion in a front-back direction of the vehicle, a rear end portion of the rail portion located more backward than the curved portion linearly extends backward in the vehicle, and a front end portion of the rail portion located more forward than the curved portion obliquely extends inward in the lateral direction of the vehicle progressively toward a front of the vehicle,
two of the driven rotary bodies are respectively arranged in a front end and a rear end of the rail portion to turn around a moving direction of the rope member, and
the drive rotary body is arranged to correspond to the curved portion of the rail portion and is engaged on a side away from the rail portion, wherein the rope member, which is wrapped over the two driven rotary bodies, is wrapped around the drive rotary body.

7. The sliding door opening and closing device according to claim 6, further comprising a housing fixed to the attaching portion, wherein the housing accommodates the drive rotary body between the housing and the attaching portion.

8. The sliding door opening and closing device according to claim 7, further comprising a guide member formed on an outer lateral side of the housing facing the rail portion, wherein the rope member, which is located on the side proximate to the rail portion and wrapped over the two driven rotary bodies, slides on the guide member.

9. The sliding door opening and closing device according to claim 7, further comprising a retainer portion, which protrudes from the housing, wherein the rope member is engaged with the retainer portion so that hanging down of the rope member is limited.

10. The sliding door opening and closing device according to claim 7, further comprising a fitting protrusion, which protrudes from the housing, wherein the fitting protrusion is fitted into a receiving recess formed in the attaching portion to receive a load applied to the housing.

11. The sliding door opening and closing device according to claim 6, wherein
the attaching portion includes:
a front attaching portion, in which the driven rotary body arranged to correspond to a front end of the rail portion is located,
a rear attaching portion, in which the driven rotary body arranged to correspond to a rear end of the rail portion is located, and
an intermediate attaching portion, in which the drive rotary body is located, and
the front attaching portion, the rear attaching portion, and the intermediate attaching portion are separate from each other or the intermediate portion is formed integrally with one of the front attaching portion and the rear attaching portion.

12. The sliding door opening and closing device according to claim 3, wherein the attaching portion is fixed to the vehicle body by means of fasteners located at opposite sides.

13. The sliding door opening and closing device according to claim 11, wherein
the guide member has a guide roller, and a cutaway portion is formed in the rear end portion of the rail portion to allow the guide roller to be mounted in the rail portion in a manner permitting the guide roller to roll, and
the rear attaching portion includes a fixing portion for fixing a lid body, which closes the cutaway portion.

14. The sliding door opening and closing device according to claim 6, wherein the attaching portion has a projection portion, which protrudes more outward in the lateral direction of the vehicle than the front end portion of the rail portion at the front end portion of the rail portion.

15. A sliding door opening and closing device for driving a sliding door to open and close a door opening formed in a lateral side of a vehicle body, the device comprising:
a rail unit configured to be attached to the vehicle body; and
a drive unit attached to the rail unit, wherein the rail unit includes:
a rail portion, which guides movement of a guide member connected to the sliding door,
a single attaching portion, which is provided in the rail portion and is adapted to be fixed to the vehicle body,
a drive rotary body and a plurality of driven rotary bodies arranged in the attaching portion, and
a rope member, which is wrapped around the drive rotary body and the driven rotary bodies to be fixed to the guide member, wherein the rail unit is adapted to be inserted into a first insertion hole, which is formed in the vehicle body and opens outward in a lateral direction of the vehicle and is located below a lower panel provided in the vehicle body below the door opening, and
the drive unit is adapted to be inserted into a second insertion hole, which is formed in the lower panel and opens upward in the vehicle, and the drive unit is layered on an upper side of the drive rotary body to rotate the drive rotary body.

* * * * *